United States Patent [19]

Sugawa et al.

[11] 4,357,095
[45] Nov. 2, 1982

[54] ELECTROPHOTOGRAPHIC COPYING MACHINE

[75] Inventors: Kazuo Sugawa, Saitama; Norio Amemiya, Hachioji, both of Japan

[73] Assignee: Olympus Optical Company Ltd., Tokyo, Japan

[21] Appl. No.: 228,374

[22] Filed: Jan. 26, 1981

[30] Foreign Application Priority Data

Mar. 18, 1980 [JP] Japan .................................. 55-34296

[51] Int. Cl.³ ............................................. G03G 15/00
[52] U.S. Cl. .................................. 355/3 R; 355/14 R; 355/25; 355/75
[58] Field of Search ................... 355/3 R, 14 R, 7, 8, 355/9, 56, 25, 64, 67, 75, 3 SH

[56] References Cited

U.S. PATENT DOCUMENTS

| | | | |
|---|---|---|---|
| 3,588,244 | 6/1971 | Murgas et al. ............................ | 355/8 |
| 3,597,074 | 8/1971 | Murgas et al. ........................... | 355/25 |
| 3,659,937 | 5/1972 | Yamanoi .................................. | 355/3 |
| 3,726,589 | 4/1973 | Difulvio et al. ......................... | 355/64 |
| 3,807,856 | 4/1974 | Rodriguez ............................... | 355/67 |
| 3,825,338 | 7/1974 | Kolibas ................................ | 355/25 X |
| 3,953,124 | 4/1976 | Kolibas ................................ | 355/25 X |
| 3,997,265 | 12/1976 | Menon et al. ........................... | 355/75 |
| 4,035,077 | 7/1977 | Vercoulen .............................. | 355/75 |
| 4,188,028 | 2/1980 | Miciukiewicz ............... | 355/3 SH X |

Primary Examiner—A. C. Prescott
Attorney, Agent, or Firm—Weinstein & Sutton

[57] ABSTRACT

A copying machine includes a shutter mechanism comprising a light shield member which intercepts the incidence of extraneous light onto a photosensitive drum through an exposure window, and a detecting member which is operated by a cover which forms a conveyor unit for a sheet-shaped original or by a book carrier on which a thick original is placed. A movement of the light shield member into or out of an exposure light path is controlled by the operation of the detecting member.

8 Claims, 8 Drawing Figures

ELECTROPHOTOGRAPHIC COPYING MACHINE

BACKGROUND OF THE INVENTION

The invention relates to an electrophotographic copying machine, and more particularly, to an electrophotographic copying machine of the type which is commonly referred to as moving original type in which a sheet original or a thick original placed on a book carrier is fed over an exposure window for copying purpose.

U.S. Pat. No. 3,659,937, assigned to Minolta Camera K.K., discloses an electrophotographic copying machine of moving original type in which an original in the form of a sheet is conveyed over an exposure window while it is closed by a cover while when copying from a thick original in the form of a book or the like, the cover is moved to an open position where it clears the exposure window to define a conveying path for a book carrier on which the thick original is placed. Such copying machine utilizes a dielectric record medium, and the sequential steps of charging, exposure, developing and fixing are directly applied to each single sheet of such record medium without causing any difficulty.

However, a problem is presented with an electrophotographic copying machine as disclosed in U.S. Pat. No. 4,171,157, assigned to Olympus Optical Co., of moving original type in which a photosensitive drum is used to provide a plurality of copies from a single exposure step, in that the incidence of extraneous light into the machine through the exposure window may be allowed immediately after the book carrier has moved past the window in the absence of any light shield which closes the window. The extraneous light erases the electrostatic latent image formed on the drum, preventing a subsequent copying operation which is utilized to provide a plurality of copies. An exemplary construction of copying machine of this type will be described more fully with reference to FIG. 1. In the electrophotographic copying machine illustrated, a cover 35, which also serves as an extension frame of a conveying path to be described later, normally closes the region above an exposure window 8, and defines an original conveying path for allowing a copying operation from a single original in the form of a sheet. Under this condition, when a sheet-shaped original 1 is placed on an inclined original guide 2 and inserted into the inlet of an original feeder comprising conveying rollers 4A, 4B, 5A, 5B and guide plates 6, 7, in a direction indicated by an arrow A, it is held between the pair of vertically aligned conveying rollers 4A, 4B to be fed toward the exposure window 8, the original 1 is held between and conveyed by another pair of vertically aligned conveying rollers 5A, 5B onto an original tray 9.

As the original 1 is fed by the original feeder, a pair of microswitches 3A, 3B located on the opposite sides of the conveying rollers 4A, 4B detect the location of the original 1 and provide an output which is utilized for timing the operation of various parts of the machine. As the original 1 moves over the exposure window 8, the original surface is illuminated by light from an illumination lamp 10, and the image of the original is projected onto a photosensitive drum 12 through Selfoc (trademark) optical member 11, which represents a focussing optical fibre having a continuously varying refractive index. The drum 12 rotates in a direction indicated by an arrow B and is initially charged in a uniform manner by a corona charger 14 before it is irradiated with the light image of the original. In this manner, an electrostatic latent image of the original 1 is formed on the drum surface. The latent image is converted into a toner image by a developing unit 15 of the dry type, and a toner image is carried to a transfer station 16 as the drum 12 continues to rotate.

A cassette 17 contains a stack of record sheets 18 which are formed of a plain paper, and which are fed one by one by an oscillating and rotating feed roller 19 and then fed by a pair of vertically aligned feed rollers 20 to the transfer station 16 in timed relationship with the rotation of the drum. At the transfer station 16, the record sheet is fed into overlapping relationship with the toner image on the drum by being passed between the drum and transfer roller 21 to which a bias voltage is applied, thus transferring the toner image onto the record sheet. Subsequently, the record sheet which is held tight against the drum 12 is separated therefrom by the action of a separating claw 22 and an airstream to be described later. Then the record sheet having the toner image transferred thereon is conveyed along a guide 23, and a pair of vertically aligned conveying rollers 24 convey it into a fixing unit 25 comprising a heater where the toner image is fixed to the sheet by melting. Subsequently, the sheet is delivered onto a copy tray 27 by another pair of vertically aligned delivery rollers 26.

Any residue of toner which remains on the drum surface without being transferred onto the record sheet is scraped off by a rotating cleaning brush 28 and withdrawn into an airstream created by a fan 29 to be collected by a filter 30. Both the cleaning brush 28 and the fan 29 are surrounded by a casing 31 which is effective to prevent the toner from being dispersed into the machine and to provide an effective pumping action upon the residual toner. The airstream withdrawn by the fan 29 is led into a duct 32 having an outlet port 32a located adjacent to the transfer station 16 so as to be utilized in the successive separation of the record sheet from drum 12 by cooperating with the separating claw 22.

The copying machine described above is adapted to provide a plurality of copies by a repeated use of the electrostatic latent image which is once formed on the drum 12 through the performance of repeated developing and transferring steps. When used in this mode of providing a plurality of copies from the single exposure, the cleaning brush 28 is moved away from the drum 12. To achieve this, brush 28 is mounted on a support 34 which is pivotally mounted on a pin 33. Also, a nuetralizing lamp 13 and charger 14 must be deactivated.

While the copying machine described above is principally used in copying from a single original in the form of a sheet, it may also be used in copying from a thick original in the form of a book or the like. In this instance, the cover 35 which carries the upper conveying rollers 4B, 5B and the guide plate 6 is turned through an angle of 180° in a direction indicated by an arrow C about a pin 36 so that the conveying rollers 4B, 5B and guide plate 6 form an extension of the conveying path which is contiguous with plane of the exposure window 8 and located above the original tray 9 (see FIG. 2).

When copying from a thick original such as a book under this condition, use is made of a book carrier on which the thick original is placed. The book carrier with the thick original thereon is initially placed on the original guide 2, and is conveyed over the exposure window 8 by conveying rollers 4A, 5A which are drive rollers, during a copying operation. As the book carrier moves past the exposure window 8, the original surface is exposed through a transparent plate on which the book is placed, thus allowing a copying operation from the book.

As mentioned previously, when the described copying machine is used in the mode which permits a plurality of copies to be obtained from the single exposure, the electrostatic latent image once formed on the drum 12 is used repeatedly, thus allowing the toner developing and transfer steps to be repeated subsequently. For this reason, after the latent image is formed, the presence of the original is no longer required, permitting the original to be removed or replaced by another original during the time a desired number of copies are being produced.

However, in actuality, if the original is removed from its position over the exposure window 8 during the time the number of copies are being produced, extraneous light which has been interrupted by the original is allowed to impinge into the interior of the machine through the window 8, thus causing a degradation of the latent image formed on the drum 12. In particular, when the book carrier is utilized to permit a copying from a thick original, the cover 35 is not in a position to close the exposure window 8 as shown in FIG. 2, so that if the book carrier is moved into or out of the position covering window 8, extraneous light 37 as indicated by an arrow impinges on the optical member 11 through the exposure window 8, thus causing the latent image formed on the drum surface to be degraded.

SUMMARY OF THE INVENTION

It is an object of the invention to eliminate the above described disadvantage of the prior art experienced in an electrophotographic copying machine of moving original type, by providing an electrophotographic copying machine having a shutter mechanism which opens or closes an exposure light path extending between an exposure window and a photosensitive drum as a cover is angularly moved and as a book carrier is moved into or out of the position.

In accordance with the invention, the shutter mechanism opens or closes the exposure light path extending between the exposure window and the photosensitive drum surface in response to the detection of the presence or absence of a cover or book carrier in a position above the exposure window. Hence the drum surface cannot experience an optical degradation if the cover is turned back to leave the exposure window exposed. When a plurality of copies are produced utilizing the book carrier, after the original surface has once been exposed by scanning to produce an electrostatic latent image, the book carrier may be removed during the time the toner developing and transfer steps are repeatedly performed in cooperation with the latent image in order to prepare the machine for the next original, without causing an extinction of the latent image by extraneous light.

DETAILED DESCRIPTION OF PREFERRED EMBODIMENTS

Figure 1:
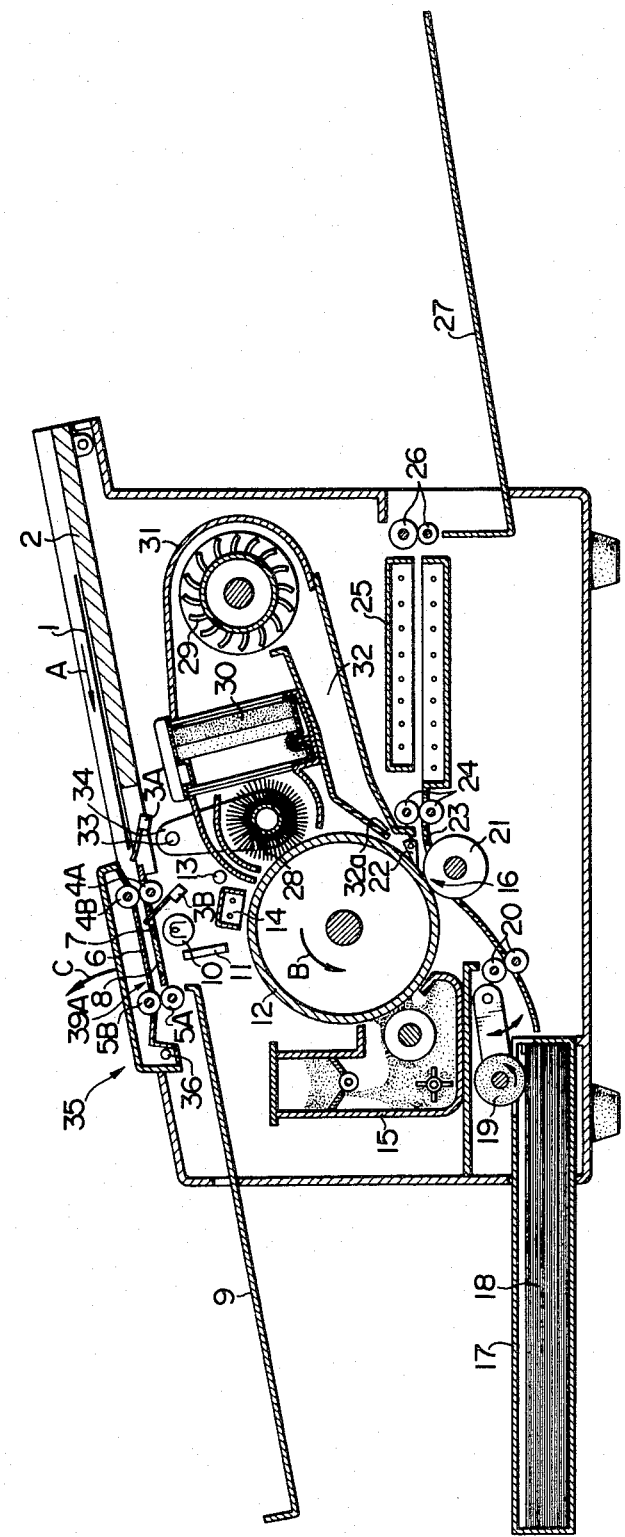
FIG. 1 is a cross section of one form of electrophotographic copying machine to which the invention may be applied.
Figure 2:
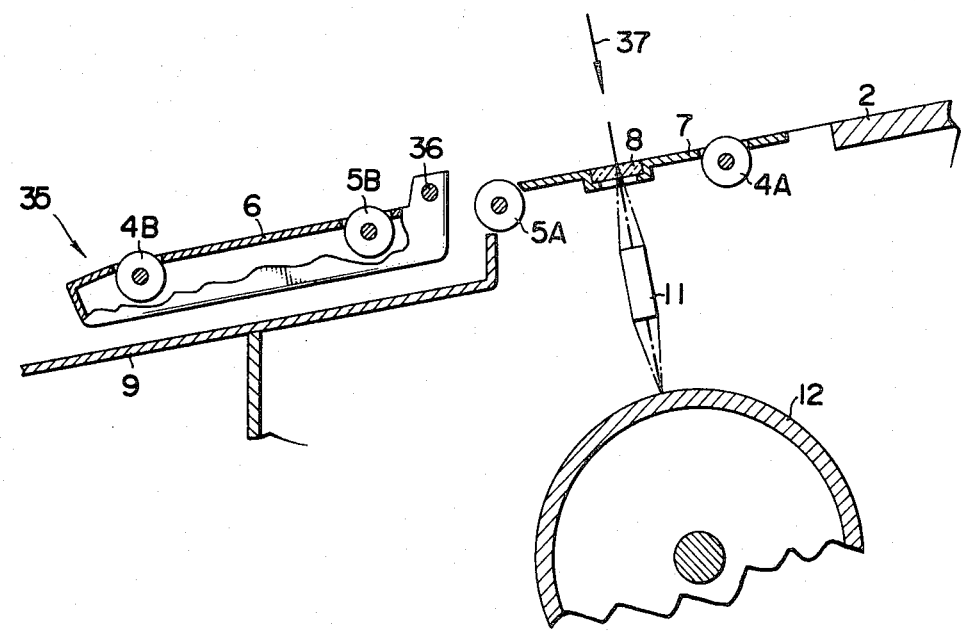
FIG. 2 is a fragmentary cross section of the machine shown in FIG. 1, illustrating a cover which is turned back to permit a book carrier to be used.
Figure 3:
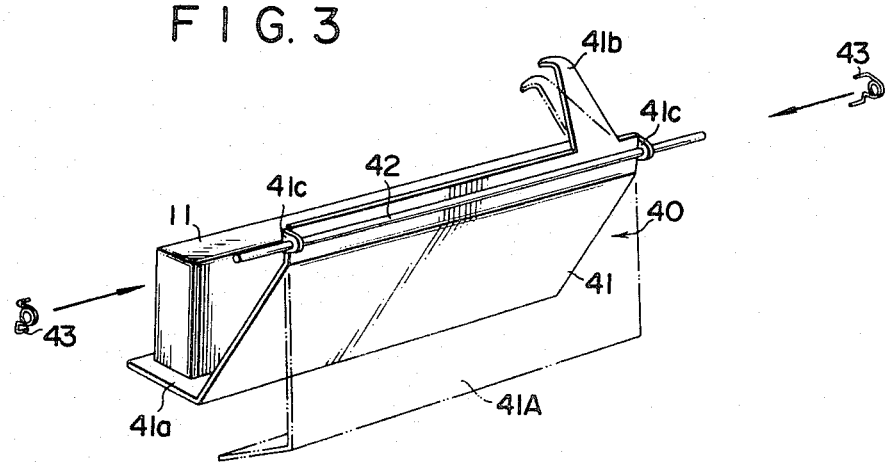
FIG. 3 is a perspective view of one form of shutter mechanism which is used in accordance with the invention.
Figure 4:
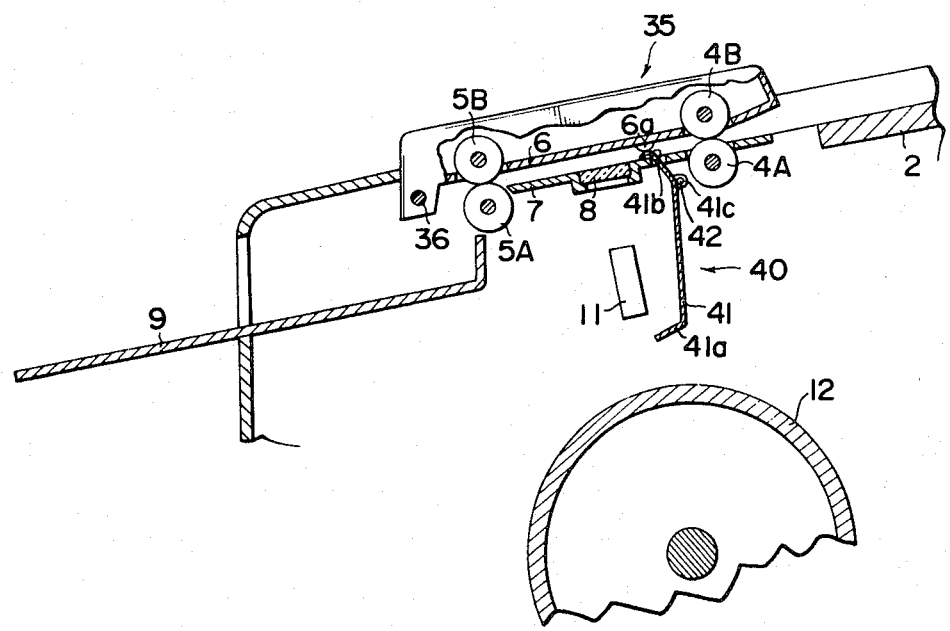
FIG. 4 is a fragmentary cross section of a copying machine according to one embodiment of the invention and incorporating the shutter mechanism illustrated in FIG. 3, indicating the use of an original in the form of a sheet.
Figure 5:
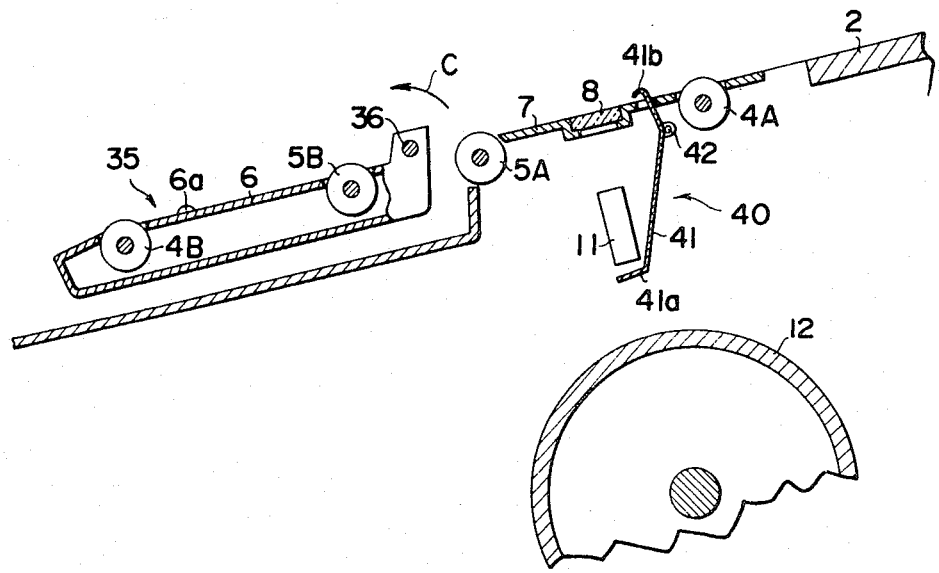
FIG. 5 is a similar cross section of the copying machine shown in FIG. 4, with the cover being turned back.
Figure 6:
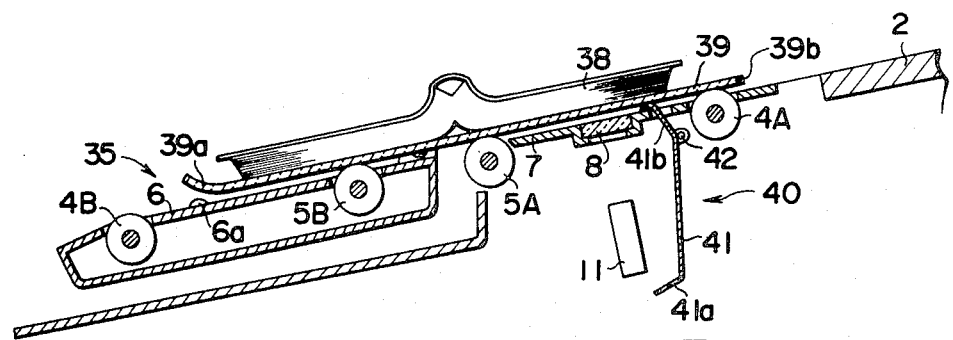
FIG. 6 is a similar cross section of the copying machine of FIG. 4, illustrating the use of a book carrier to permit copying from a thick original.
Figure 6:
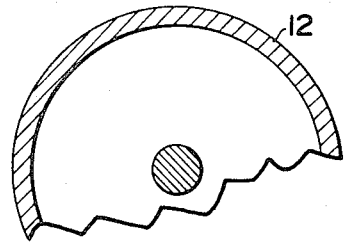

Referring to FIG. 3, there is shown one form of shutter mechanism 40 or light shield member 41 used in the present invention, in a perspective view. The light shield member 41 comprises a single sheet material such as sheet metal having a sufficient length to close the entire exposure light path. As shown, the sheet material is folded along its length, and its longitudinal ends are formed with tabs 41c in which openings are formed to receive a support shaft 42 which is mounted on a stationary part of the copying machine. In this manner, member 41 is rotatably disposed adjacent to the exposure window 8, as shown in FIGS. 4 to 6. A lower portion of the light shield member 41 which extends below the lower end of the optical member 11 is lengthwise folded into an L-configuration, as viewed in cross section, to provide a light shield 41a which extends toward and below the optical member 11. Adjacent to one longitudinal end, an upper portion of the light shield member 41 is again folded to extend obliquely upward, with its edge being formed into a rounded configuration to provide an integral detecting member 41b which serves as a contactor having a smooth top. The detecting member 41b is arranged so that its edge projects above the guide plate 7 over which the original passes. The purpose of the detecting member 41b is to detect the presence or absence of a cover 35 or a book carrier 39 over the exposure window 8 by having its top end depressed by the cover 35 or book carrier 39 if either the cover 35 or carrier 39 is present. A pair of torsion springs 43 are disposed on the support shaft 42 and have their ends anchored to the tabs 41c and stationary parts of the copying machine, thus normally urging the light shield member 41 to rotate clockwise.

Referring to FIGS. 4 to 6, it will be noted that the guide plate 6 carried by the cover 35 is integrally formed with a protuberance 6a which is located in opposing relationship with the top of the detecting member 41b.

Consequently, when the cover 35 closes the exposure window 8 and an original in the form of a sheet is used in a copying operation as shown in FIG. 4, the protuberance 6a on the guide plate 6 presses against the top end of the detecting member 41b, whereby the light shield member 41 turns counterclockwise about the support shaft 42 against the resilience of the torsion springs 43, assuming the position 41A shown in phantom line in FIG. 3. In this position, the light shield 41a of the member 41 moves away from the lower end of the optical member 11 and thus is retracted out of the exposure light path. In this manner, when copying from the original, the exposure light path extending between the exposure window 8 and the drum 12 and including the optical member 11 is maintained open, presenting no interference with the formation of an electrostatic latent image on the drum 12 as a result of the exposure of the original.

When the cover 35 is turned back in the direction of the arrow C to define an extension of the conveying path as indicated in FIG. 5 in order to permit copying from a thick original while utilizing a book carrier, the protuberance 6a on the guide plate 6 which is carried by the cover 35 moves away from the detecting member 41b of the shutter mechanism 40, so that the light shield member 41 rotates clockwise under the resilience of the torsion springs 43, raising the detecting member 41b above the guide plate 7 and causing the light shield 41a to move close to the bottom end of the optical member 11, thus interrupting the exposure light path between the exposure window 8 and the drum 12. Consequently, although the window 8 is exposed to allow the incidence of extraneous light, such light is intercepted by the light shield 41a and is prevented from reaching the drum 12.

If the book carrier 39 (see FIG. 6) carrying a thick original 38 thereon is now placed on the original guide 2 and is moved toward the exposure window 8, the book carrier 39 will move past the exposure window 8 while depressing the detecting member 41b against the resilience of the torsion springs 43,43 with the front end of the bottom 39a thereof when the latter has moved past the conveying roller 4A. Consequently, when the thick original 38 on the book carrier 39 reaches the exposure window 8, the light shield member 41 has been turned counter-clockwise, moving its light shield 41a away from the bottom end of the optical member 11 and out of the exposure light path, as shown in FIG. 6. In this manner, an exposure of the original surface through the open exposure light path inclusive of the optical member 11 is permitted as the original surface moves past the exposure window 8, thereby forming an electrostatic latent image on the drum 12.

Upon completion of the exposure of the thick original 38, when the book carrier 39 moves over the conveying rollers 4A, 5A, 5B, 4B until the rear end 39b of the book carrier 39 moves past the detecting member 41b of the light shield member 41, the latter is released from the pressure exerted by the book carrier 39, whereby the shutter mechanism 40 again rotates clockwise under the resilience of the torsion spring 43 to a position directly opposite to the lower end of the optical member 11 as shown in FIG. 5 where it intercepts the exposure light path.

If the book carrier 39 is removed from the conveying path in order to prepare the machine for the next original to be copied as when the drum 12 continues to rotate to produce a plurality of copies subsequent to the single exposure mentioned above, the exposure window 8 becomes exposed, but no incidence of extraneous light onto the drum 12 occurs since the exposure light path is intercepted by the light shield 41a, thus preventing the extraneous light from causing an extinction or any degradation in the quality of the electrostatic latent image formed on the drum 12 by the described exposure. electrophotographic copying machine according to another embodiment of the invention. In this embodiment, a shutter mechanism 50 in accordance with the invention comprises a light shield member 51 formed of a plate of a magnetizable material such as iron and disposed within the machine adjacent to the exposure window 8 so as to extend perpendicular to the exposure light path, an electromagnet 52 disposed in opposing relationship with the light shield member 51 on the opposite side of the exposure light path from the latter, a battery 53 for energizing the electromagnet 52, and a detecting member 54 such as microswitch for detecting the presence or absence of the cover 35 or book carrier 39 (see FIG. 6) at a point above the exposure window 8 to thereby open or close the electrical circuit of the electromagnet 52. The detecting member 54 includes an actuator 54c disposed for vertical movement in a direction perpendicular to the guide plate 7. The actuator 54c is always maintained in contact with an electrical contact 55 which is connected to the electromagnet 52. The detecting member 54 has a top end 54a which is shaped into a rounded form and which projects above the guide plate 7, and a lower end 54b which is engaged by one end of a return spring 56, the other end of which anchored to a stationary part of the machine, thus normally urging the detecting member 54 upward.

When the machine is used to copy from an original in the form of a sheet, the protuberance 6a on the guide plate 6 presses the top end 54a of the actuator 54c downward which is therefore maintained in its lower position against the resilience of the return spring 56. At this time, the lower end 54b of the detecting member 54 is spaced from an electrical contact 57 which is connected to the battery 53, so that the electrical circuit of the electromagnet 52 is interrupted and thus the latter remains deenergized. Consequently, no attraction is applied to the light shield member 51 from the electromagnet 52, but the light shield member 51 is held retracted from the exposure light path formed between the exposure window 8 and the optical member 11, under the resilience of a return spring 58 which is disposed across the member 51 and a stationary part of the machine. In this manner, the exposure light path is maintained open, presenting no difficulty in the formation of a latent image on the drum 12 through the exposure of the sheet-shaped original.

Figure 7:
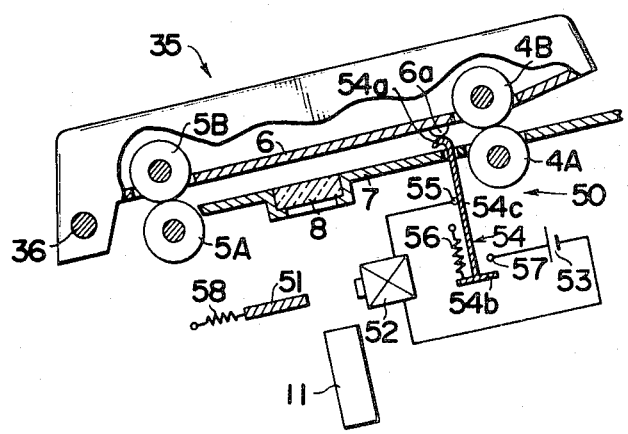
FIG. 7 is a fragmentary cross section of a copying machine according to another embodiment of the invention, illustrating a copying operation from an original in the form of a sheet.
Figure 7:
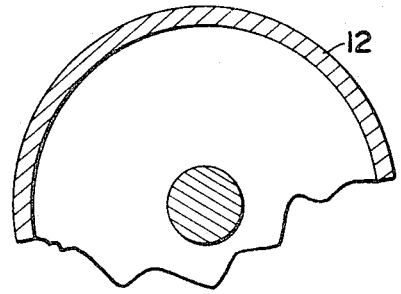
Figure 8:
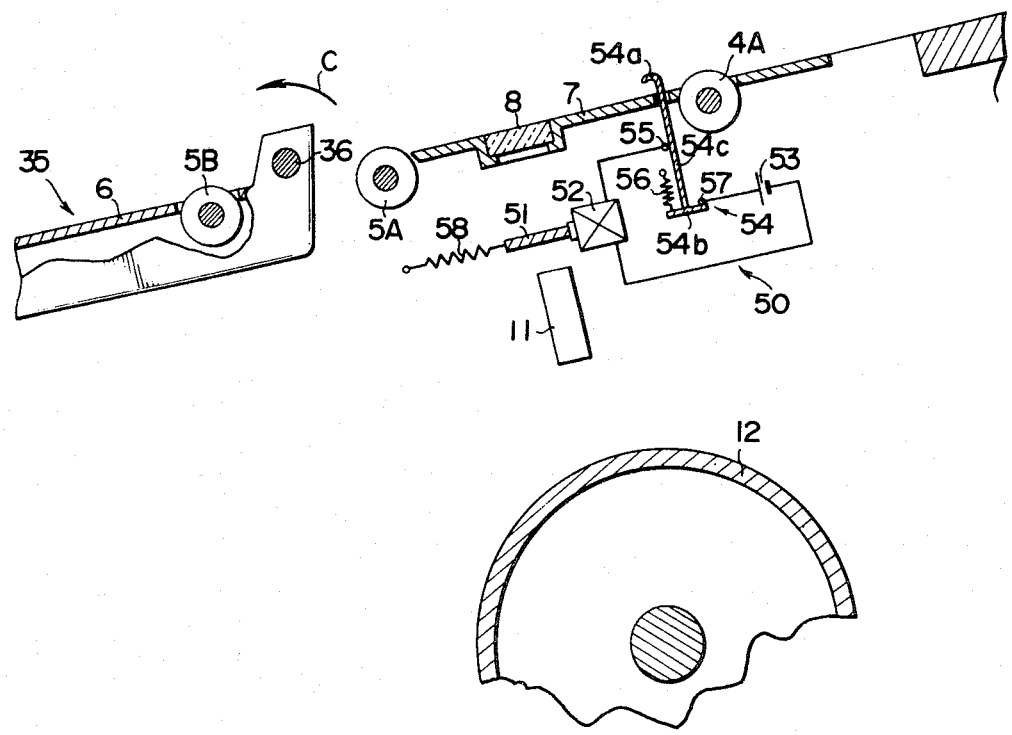
FIG. 8 is a fragmentary cross section of the copying machine of FIG. 7 with the cover being turned back.

If the cover 35 is now turned in the direction of the arrow C as shown in FIG. 8, the protuberance 6a (see FIG. 7) on the guide plate 6 moves away from the top end 54a of the actuator 54c, which is therefore allowed to move upward under the resilience of the return spring 56, with its lower end 54b moving into contact with the electrical contact 57 to complete the electrical circuit of the electromagnet 52. Thereupon the electromagnet 52 is energized and attracts the oppositely located light shield member 51, which then moves against the resilience of the return spring 58 to intercept the exposure light path. Hence, the incidence of extraneous light onto the drum 2 is prevented if the window 8 is exposed since such extraneous light will be intercepted by the light shield member 51.

When the book carrier 39 (see FIG. 6) is used, the actuator 54c of the detecting member 54 will be depressed to open the electrical circuit of the electromagnet 52 as the front end of the bottom 39a of the book carrier 39 reaches the location of the detecting member 54, whereby the light shield member 51 moves out of the exposure light path, leaving the shutter mechanism 50 in the same position as shown in FIG. 7 which is assumed when the cover 35 is located above the exposure window 8. As the book carrier 39 is further moved until its rear end 39b (see FIG. 6) clears the detecting member 54, the shutter mechanism 50 operates to interrupt the exposure light path as shown in FIG. 8 and in the same manner as mentioned above in connection with the previous embodiment.

What is claimed is:

1. An electrophotographic copying machine comprising
   a cover which is located in opposing relationship with an exposure window when copying from an original in the form of a sheet and defines a conveyor unit for the original and which is angularly moved to a position remote from the exposure window when copying from a thick original and defines an extension of an original conveying path for allowing a thick original placed on a book carrier to move past the exposure window;
   a detecting member disposed adjacent to the exposure window and projecting above the plane of the original conveying path so as to be depressed by the cover or the book carrier to thereby detect the presence of the cover or book carrier above the exposure window which is effective to intercept the incidence of extraneous light;
   and a light shield member adapted to be moved from a position where it intercepts an exposure light path extending between the exposure window and a photosensitive drum on which an electrostatic latent image corresponding to an original is formed to a position opening the exposure light path in response to the depression of the detecting member by the cover or book carrier.

2. An electrophotographic copying machine according to claim 1 in which the light shield member comprises a single sheet material which is integrally formed with a light shield along its lower edge for intercepting the exposure light path and a detecting member along its upper edge, the sheet material being disposed within the machine and urged for angular movement so that the light shield is positioned on the exposure light path when the detecting member projects above the plane of the original conveying path.

3. An electrophotographic copying machine according to claim 1 in which the light shield member is disposed within the machine for movement in a direction transverse to the exposure light path, the light shield member being formed by a plate of a magnetizable material which is normally urged to clear the exposure light path, the machine further including an electromagnet which is disposed in opposing relationship with the light shield member on the opposite side of the exposure light path, the energization of the electromagnet being controlled by the detecting member, the exposure light path being intercepted as the light shield member is held attracted by the electromagnet.

4. An electrophotographic copying machine according to claim 3 in which the detecting member comprises a microswitch having an actuator which is disposed for vertical movement through and in a direction perpendicular to the length of an original guide plate defining the original conveying path and normally urged to project above said guide plate, the microswitch being normally maintained in contact with an electrical contact which is connected to the electromagnet, the electromagnet being energized when the actuator moves upward into contact with another electrical contact.

5. An electrophotographic copying machine comprising a photosensitive surface and cover means movable between a first position in opposing relationship with an exposure window when copying from an original in the form of a sheet positioned between said cover and said window, and a second position displaced from said exposure window;
   means for providing a light path for directing light from the exposure window to said photosensitive surface; and
   light shielding means movable from a position displaced from said light path enabling light passing through the exposure window to reach said photosensitive surface to a position intercepting said light path for preventing light from passing through the exposure from reaching the photosensitive surface responsive to placement of the cover means in said first position.

6. The copying machine of claim 5 wherein said light shielding means comprises sensing means for sensing the movement of said cover means to said first position for moving the light shielding means to its light intercepting position.

7. The copying machine of claim 5 further comprising thick original carrier means; and
   said light shielding means being moved to said intercepting position responsive to placement of said carrier means upon said exposure window.

8. The copying machine of claim 5 further comprising means normally urging said light shielding means towards the position displaced from said light path.

* * * * *

UNITED STATES PATENT AND TRADEMARK OFFICE
CERTIFICATE OF CORRECTION

PATENT NO. : 4,357,095
DATED : November 2, 1982
INVENTOR(S) : Kazuo Sugawa and Norio Amemiya It is certified that error appears in the above—identified patent and that said Letters Patent is hereby corrected as shown below:

Column 1, Background of the Invention, line 52, after the word "window" should read as follows: --8. After passing over the exposure window 8, --.

Column 4, Detailed Description of Preferred Embodiments, line 54, after "ends" insert --respectively--.

Column 5, line 68, after "exposure.", starting a new paragraph, insert --Figure 7 is a fragmentary cross section of an--.

Signed and Sealed this

Fourteenth Day of June 1983

[SEAL]

Attest:

DONALD J. QUIGG

Attesting Officer  Acting Commissioner of Patents and Trademarks